J. T. NORRIS.
ELECTRIC TRAP FOR RATS, &c.
APPLICATION FILED SEPT. 24, 1908.
909,814.
Patented Jan. 12, 1909.
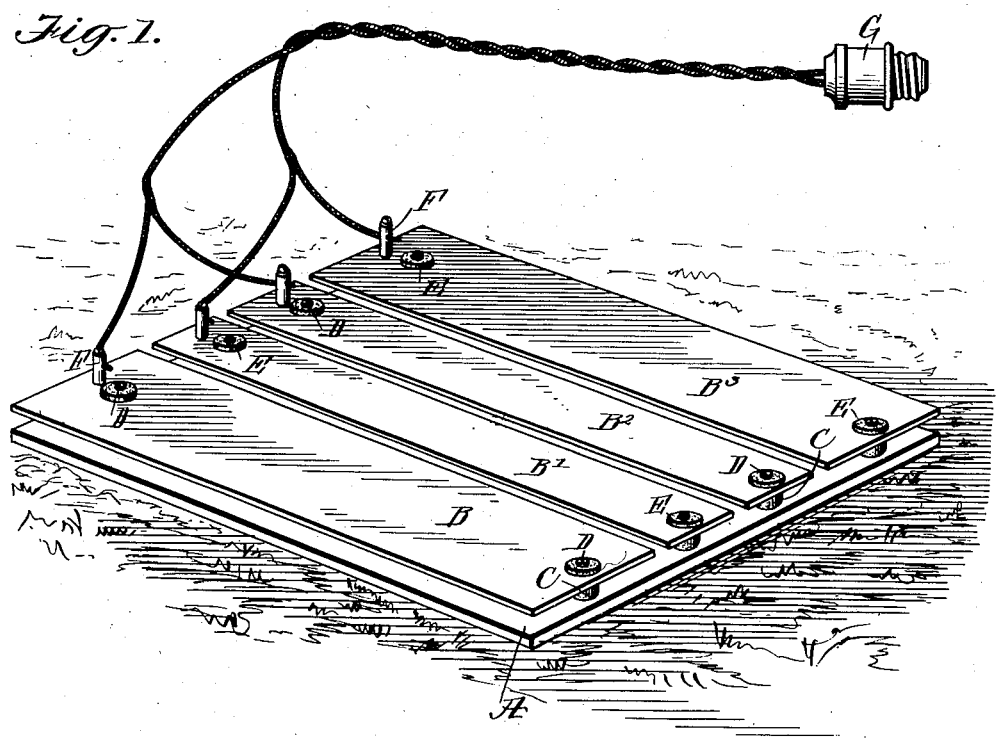
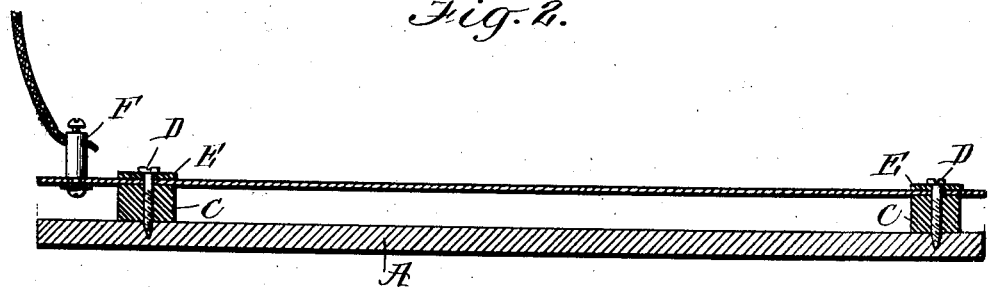
WITNESSES
INVENTOR
JOHN T. NORRIS.
BY
ATTORNEYS

UNITED STATES PATENT OFFICE.

JOHN T NORRIS, OF TROY, NORTH CAROLINA, ASSIGNOR OF ONE-HALF TO CHRISTOPHER C. WADE, OF TROY, NORTH CAROLINA.

ELECTRIC TRAP FOR RATS, &c.

No. 909,814.        Specification of Letters Patent.        Patented Jan. 12, 1909.

Application filed September 24, 1908. Serial No. 454,521.

*To all whom it may concern:*

Be it known that I, JOHN T. NORRIS, a citizen of the United States, residing at Troy, in the county of Montgomery and State of North Carolina, have invented an Improved Electric Trap for Rats, &c., of which the following is a specification.

My invention relates to improvements in traps for the extermination of rats and other vermin and has for its object to produce a simple, cheap and efficient means of ridding houses of rats and other pests, which can be easily handled and moved about as necessity requires.

My invention consists in certain novel features of construction, arrangement and combination of parts as will be hereinafter fully described and pointed out in the claims, reference being had to the accompanying drawing, in which—

Figure 1 is a perspective view of my improvement connected with an electric socket. Fig. 2 is a vertical section of same.

In carrying out my invention I use a base board A of wood and support on the same the plates B, B', $B^2$, $B^3$, of tin, or other conducting material, by means of the porcelain or rubber separators C, screws or pins D being driven through the washers E of rubber or other insulating material, and through the separators C into the base board A.

The plates B, B', $B^2$, $B^3$, are thus held above the base board A with their longitudinal edges separated about one half an inch apart.

Each plate is provided with a binding post F to which the wires from an electric lighting or electric power system, are connected. In the present instance the wires extend from a socket G such as is used in incandescent lighting systems, the branch wires being so arranged that a positive wire is connected to plate B, while a negative wire is connected to plate B', another positive wire to plate $B^2$, and another negative wire to plate $B^3$. If now the socket is screwed into place in a lighting system and the current turned on the plates B, B', $B^2$, $B^3$, will become electrically charged so that the alternate plates become positive and negative electrodes respectively.

A lure or bait is placed either on the trap or contiguous thereto so as to attract the rats. If now the rat walks upon the plates and places one foot on say plate B, and another on $B^1$, a circuit will be completed through the body of the rat and it will be instantly electrocuted.

My improved trap is applicable where any source of electrical energy is accessible, and it can be readily moved about from place to place as occasion demands.

I claim—

1. An electric trap comprising an insulated base a series of conducting plates separated from each other and supported on said base but insulated therefrom, and positive and negative wires adapted to be connected with a source of electrical energy and with alternate plates.

2. An electric trap, comprising a base board of nonconducting material, insulating blocks mounted on said base, conducting plates supported on said blocks and separated from each other, and positive and negative wires adapted to be connected with a source of electrical energy and respectively with alternate plates.

JOHN T. NORRIS.

Witnesses:
J. A. LISK,
I. E. SAUNDERS.